April 2, 1946.    H. F. DRECHSLER ET AL    2,397,478
ELECTRIC COOKER
Filed May 28, 1941    2 Sheets-Sheet 1
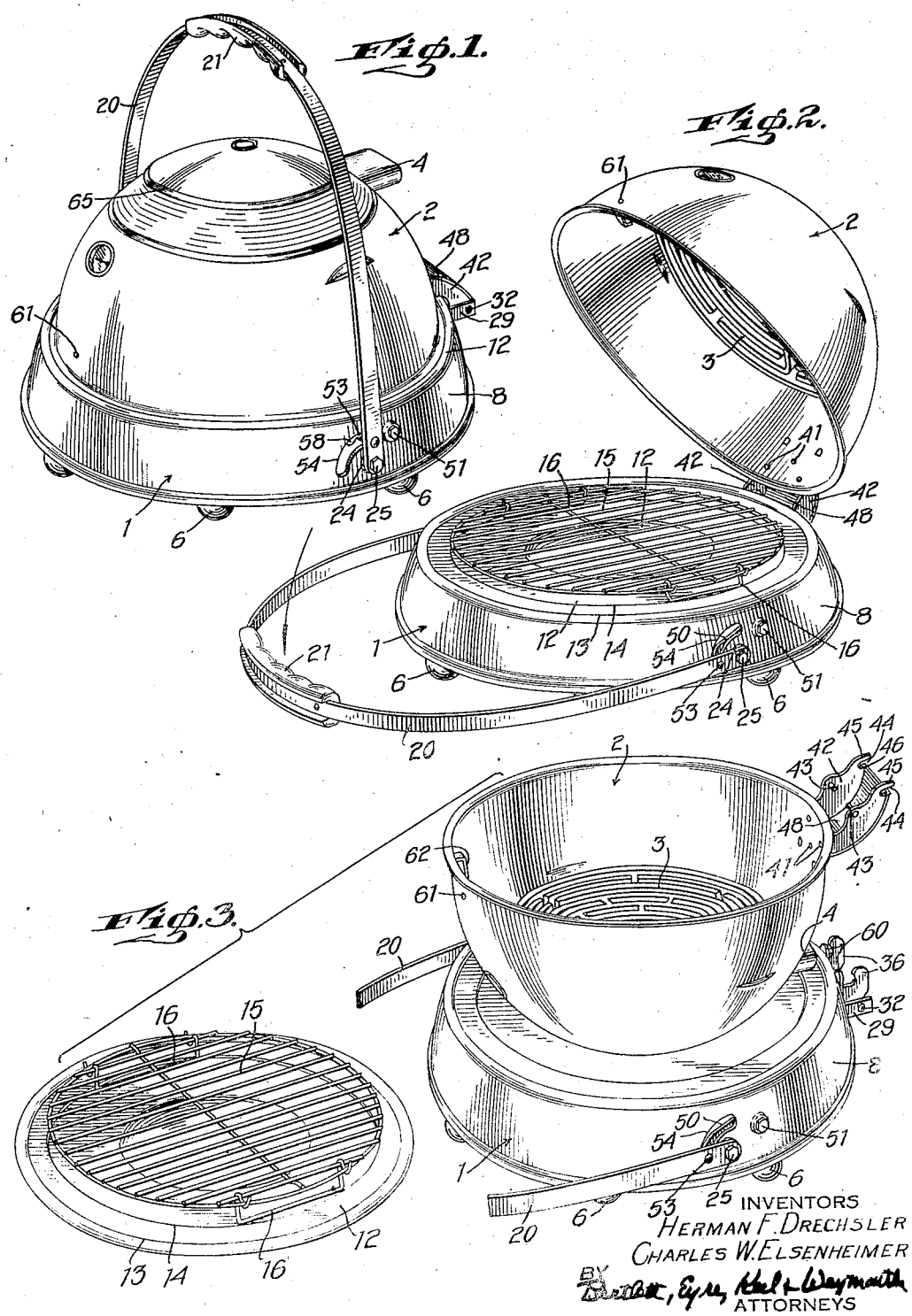
INVENTORS
HERMAN F. DRECHSLER
CHARLES W. ELSENHEIMER
ATTORNEYS

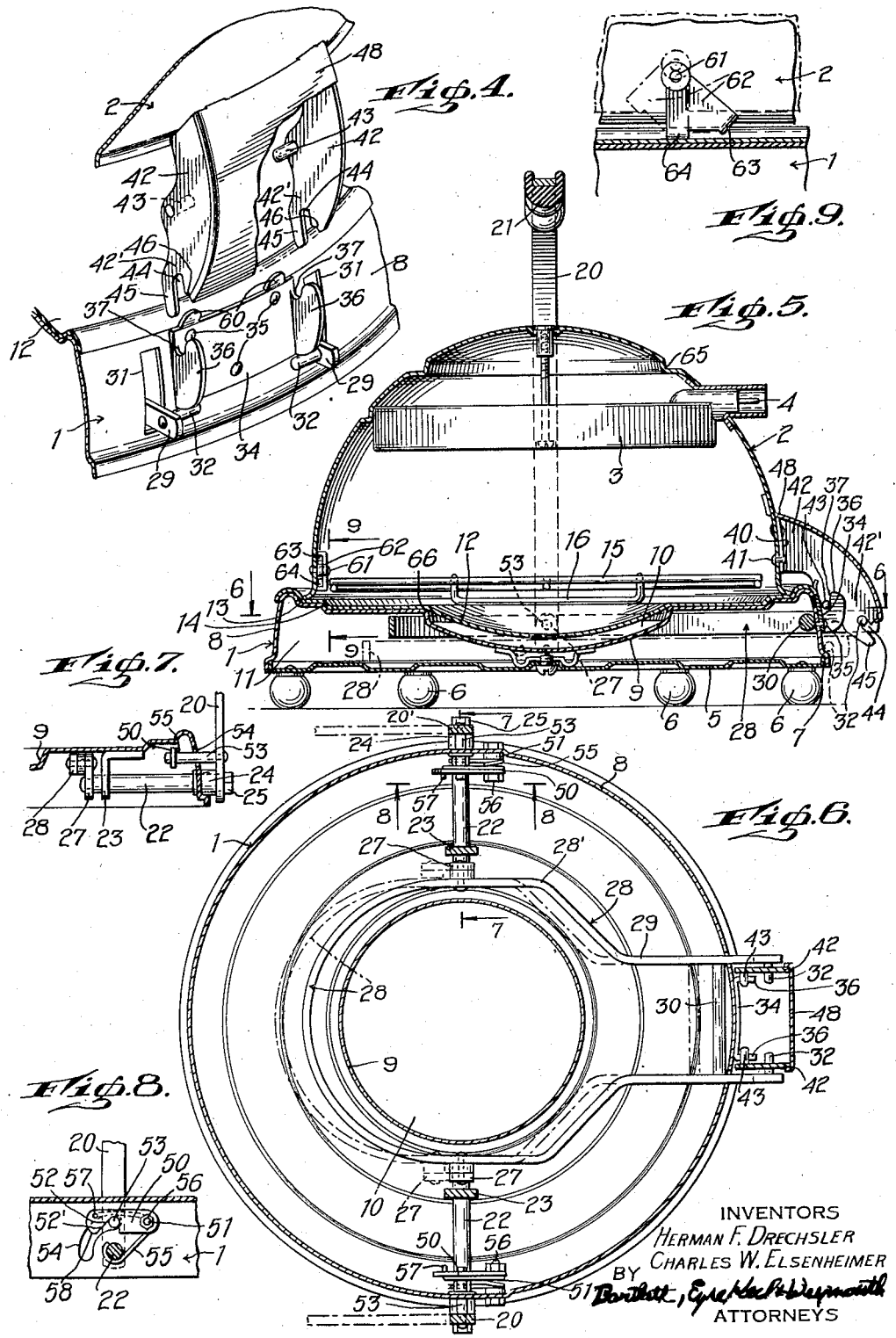

Patented Apr. 2, 1946

2,397,478

UNITED STATES PATENT OFFICE 2,397,478

ELECTRIC COOKER

Herman F. Drechsler and Charles W. Elsenheimer, Meriden, Conn., assignors, by mesne assignments, to Manning, Bowman & Co., Meriden, Conn., a corporation of Delaware Application May 28, 1941, Serial No. 395,508

9 Claims. (Cl. 126—275)

This invention relates to broilers, cookers, and the like, and particularly to broilers of the reflector type, although certain features of the invention are usable in other types of broilers.

One object of the invention is a broiler of the type having a base and a liftable cover therefor with novel and improved means for carrying the broiler, lifting and lowering the cover, and supporting the cover with respect to the base.

A further object of the invention is a broiler of the above-indicated character having a novel and improved detachable fastening mechanism between the base and the cover, enabling the lifting of the cover from the base at will and with the greatest facility.

A further object of the invention is a broiler or the like of the above indicated character embodying a novel and improved combined carrying handle and cover actuating mechanism, whereby the broiler may be easily and readily moved and the cover manipulated to open and closed positions without burning the hands.

Further objects of the invention will hereinafter appear.

For a better understanding of the invention reference may be had to the accompanying drawings, wherein—

Figs. 1, 2 and 3 are perspective views illustrating a broiler embodying the invention;

Fig. 4 is a perspective view of the detachable fastening and actuating mechanism for the cover;

Fig. 5 is a vertical sectional view through the broiler;

Fig. 6 is a sectional view along the line 6—6 of Fig. 5; and

Figs. 7, 8 and 9 are views of details of the broiler.

Referring to the drawings, the broiler embodies a base 1 and a cover 2, the latter having a heater element 3 mounted therein and being adapted and constructed to reflect the heat down upon the food being cooked which is resting upon the base 1. In the particular embodiment shown, the cover 2 is dome-shaped. An electrical socket 4 is indicated diagrammatically for making the necessary electrical connection for supplying electrical energy to the heater 3. The base 1 is provided with a metallic bottom 5 carrying insulating feet 6 for support upon a table or the like. The base includes an inverted pan-like member resting upon and fastened to the base plate 5. The base plate 5 has a periphery 7, the side of this pan-like member being indicated at 8, and the upper part having its center part spun downwardly at 9 to form a chamber 10 thereabove, this downwardly spun central part 9 projecting down into the chamber 11 forming the hollow of the base member. A removable drip pan 12 is supported on top of this base, this drip pan having in its central part a depression corresponding to the chamber 10 and having its peripheral edge formed with shoulders 13 and 14 corresponding to the similar annular shoulders formed in the base so as to firmly center the drip pan. A wire grid rack 15 of conventional form is supported on the drip pan, this wire grid or grill member conforming generally to the dimensions of the drip pan within the annular shoulder 14. This grill member may have conventional pivoted wire supports 16 on opposite sides thereof for supporting the grill at a short distance above the drip pan.

The broiler is provided with a bail-carrying member 20 formed of metal having a handle grip 21 of any suitable insulating material. The ends of this bail 20 are rigidly fastened to rock shafts 22, these shafts being journaled at their outer ends in holes formed in the sides 8 of the base member and at their inner ends in brackets 23 fastened as by soldering or welding and projecting downwardly from the internal upper surface of the base member 1. In the particular embodiment shown, the ends of the bail member are spaced from the sides of the base by the sleeve or spacer members 24, the latter being either integrally formed with the shafts 22 or formed separately therefrom, and the ends of the bail 20 may be fastened to the ends of the shaft in any suitable manner, as by means of the bolts indicated at 25, which project through the bail or handle and clamp the same firmly to the rock shafts 22. The handle or bail member 20 enables, therefore, the housewife to carry the broiler from one place to another. By manipulation of the same bail or handle member the lid 2 may be lifted and lowered.

The inner ends of the rock shafts 22 carry crank arms 27, and these crank arms at their free ends are pivotally connected with a U-shape reciprocating member 28, this U-shape member 28 being large enough to clear the central part 9 which projects down into the chamber 11. The legs 29 of the U-member are bent inwardly towards each other as indicated at 28' for a short distance and are then continued in parallel relation and rigidly fastened in spaced parallel relation by means of the bridging pin 30. The side of the base 8 is provided with vertical slots 31 in line with the legs 29 of the U member, and these legs project therethrough and are provided with actuating pins 32 extending inwardly therefrom, these pins in the particular embodiment shown being in all positions disposed outside of the base 1.

The base 1 and the cover 2 are provided with a combined detachable hinge fastening means and a means whereby the U-yoke member 28, 29 through the manipulation of the bail or handle member 20 may actuate or move the cover 2 from the closed position shown in Fig. 1 to the open position shown in Fig. 2 or vice versa. This hinge structure comprises a bracket member 34 firmly fastened to the side of the base member 1 as by riveting indicated at 35. This bracket member has formed thereon a pair of outstanding lugs or wings 36, these being preferably formed as indicated integrally with the bracket, and these wings or lugs 36 are provided with open notches or sockets 37 on their upper edges for the reception of the hinge pins of the cooperating mechanism on the cover 2. This cooperating mechanism comprises a bracket 40 which is secured to the side of the cover 2 in any suitable manner as by the rivets 41 indicated. This bracket carries downwardly and outwardly extending hinge elements 42, and in the particular embodiment shown, these hinge elements 42 are formed integrally with the part 40. The hinge elements 42 carry the hinge pins 43 which engage and rest in the open sockets 37 of the lugs 36, as shown in Figs. 5 and 6. The hinge parts 42 are extended downwardly below the level of the hinge pins 43 and the hinge sockets 37. These extensions 42' are provided with sockets or slots 44 for receiving the actuating pins 32 of the movable yoke 28, 29. These slots are formed by elongated fingers 45 on one side and by shorter walls on the opposite side terminating in notches or beveled-off parts 46. When the cover is mounted for reflector operation as shown in Figs. 1 and 2 the fingers 45 of the hinge parts 42 are disposed between the actuating pins 32 and the side walls of the base of these actuating pins 32, and in the particular embodiment shown the latter engage the bottom or near the bottom of the slots 44. In the particular embodiment shown the outer sides of the hinge members 42 are curved as indicated and receive a cover plate 48, this cover plate extending down to a point beyond the lugs or wings 36 and thereby entirely housing the same.

The handle or bail member 20 may be manipulated, therefore, through the ninety degrees to open and close the cover 2 as shown in Figs. 1 and 2, the crank arms 27 being vertically disposed in the particular embodiment shown when the cover 2 is down and the actuating pins 32 of the yoke 28, 29 are in their outermost position. In this position the yoke 28 is preferably slightly spaced from the top of the base member 1, and when the bail is moved to the downward position shown in Fig. 2 the yoke is given both a slight downward movement and a reciprocating movement with the actuating pins 32 following the arc of the circle about the hinge pins 43 or sockets 37 as a center. During the lifting of the handle 20 to its uppermost position the reverse movements take place. It is observed that in the closed position of the lid 2 the line of pull of the legs 29 is substantially below the level of the pivot 37, 43, giving a sufficient leverage to initiate the lifting of the lid 2, and this leverage increases as the lid 2 is lifted. With the lid in the uppermost position and the handle 20 in its lowermost position indicated in Fig. 2, the lid 2 is held firmly in the vertical position without the necessity of holding on to the handle 20, the slight pull due to the weight of the lid 2 in its uppermost position being exerted through the yoke 28, 29 with the cranks 27 at substantially dead center. Another important feature of the structure is that which permits the reflector heater unit 2 to be lifted from the base with the hinge connections and the operative connections disengaged by the mere act of lifting the unit 2. This is possible by reason of the hinge pins 43 simply resting in the open top recesses or sockets 37 and by the pin slot operative connection 44, 32 between the extension 42' and the yoke 28, 29. For example, in order to lift the cover reflector unit 2 bodily from the base it is only necessary to lift the cover vertically and this act of lifting results in the disconnection of the hinge connections and in the disconnection of the operative connections. This lifting of the cover unit 2 bodily from the base is facilitated by bringing the handle 20 over to the position parallel to the base in which position the fingers 45 forming part of the slots 44 are substantially vertically disposed so as to effect a disengagement by the simple lifting action. With equal facility and simplicity the cover unit 2 may be reinserted by lowering it down upon the base.

The handle 20 is yieldingly held in the vertical position by means of a pair of spring latches 50 which are pivotally mounted at 51 to the side of the base and having notches 52 engaging pins 53 projecting inwardly from the handle or bail 20 at points slightly removed from the rock shafts 22. The side of the base is provided with arcuate slots 54 to accommodate the passage of the holding pins 53 therethrough. These latches 50 are yieldingly held with the pins 53 disposed in the notches 52 by means of springs 55, these springs being coiled around pivotal pins 56 forming the pivot 51 for the latch with one end of the spring being hooked around the rock shaft 22 and the other end of the spring being fastened as indicated at 57 to the latch. The notches 52 are provided with cam surfaces 52' for permitting easy egress of the pins 53 from the notch against the tension of the spring 55, and this cam surface merges into the rounded nose part 58 which is engaged by the pin 53 in the upward movement of the handle 20 to permit easy ingress of the pin into the notch. The handle 20 is thereby yieldingly held in the vertical position until the operator engages it to move it to the lower position indicated in Fig. 2 and thereby lift the lid 2 to the open position.

Referring to Fig. 4, the bracket 34 is provided with tabs or tongues 60 on its upper edge which are turned slightly downward for the purpose of preventing hinge pins 43 from traveling upwardly out of sockets 37 upon any extremely rapid manipulation of handle 20.

Referring to Fig. 9, the cover 2 has pivoted to the inner side thereof at 61 an adjustable lifter sector 62 for engaging the periphery of the base and holding the front edge of the cover slightly spaced from the periphery of the base to permit ventilation during the broiling or cooking operation. This lifting element has two supporting feet 63 and 64 which are of different radial distances from the pivotal point 61, whereby the cover may be supported at two different ventilating distances. This lifting sector is similar to that disclosed in application Serial No. 387,601, filed April 9, 1941, which matured into Patent No. 2,342,692 on February 29, 1944. The cover or dome reflector element 2 is provided with a supporting rim or edge 65 for support on the annular shoulder 66 of the base 1, whereby the cover 2 may be inverted and used as a cooker illustrated in Fig. 3, as set forth more fully in the application Serial No. 307,749, filed December 6, 1939, which matured into Patent No. 2,269,480 on January 13, 1942. In this case the drip pan 12 and the grill 15 are removed. The cover or reflector element 2 may be readily removed from the base 1 as indicated in Fig. 4, while the cover is in the upper position indicated in Fig. 2, and Fig. 4 illustrates the parts being separated.

We claim:

1. In a cooker of the character set forth, a base member, a cover member therefor and a handle for lifting and lowering the cover member, said base and cover members comprising a detachable hinge permitting the lifting of the cover from the base member, and an operating connection between said cover and said handle which is similarly separable when the cover is removed from the base said hinge comprising a bracket member projecting outwardly and downwardly from the cover, said bracket member having a detachable connection at the hinge pivot and a detachable operating connection with the handle, said last-named detachable connection comprising a pin and slot connection which are separable only when the cover is in a lifted position with respect to the base.

2. In a cooker of the character set forth, a base member, a cover member, and operating handle, one of said members having a hinge element with an open notch or socket, the other of said members having a hinge element with a pin for resting in said open socket, and the hinge element on said cover member having a detachable pin slot operative connection with said operating handle, said operative connection between the handle and the cover member comprising an operating link having an operating pin on one end, said cover hinge element comprising an open-ended slot containing said pin, the open end of said slot being rearwardly disposed and permitting separation of the cover member from the base member and the operative connection by causing the cover member to assume a movement substantially parallel with said slot.

3. In an electric cooker of the character set forth, a base element comprising a grill, a cover supported thereon and directly hinged thereto at a point near its periphery, a bail handle support for carrying said cooker which is pivotally fastened to the base and moving about a pivotal axis disposed parallel to the axis of the hinge, and operative connections between said bail handle and the cover for lifting said cover about its hinge pivot when the bail member is moved about its pivot, said operative connections being disposed within the base and beneath the grill and comprising a reciprocating yoke member.

4. A cooker of the character set forth in claim 3 wherein said reciprocating yoke member is operatively attached at one end to the bail member and at its other end to a bracket forming a part of the hinge.

5. In a cooker of the character set forth, a base member, a cover member therefor which is hinged thereto for angular movements thereabout and a handle for lifting and lowering the cover member, said base and cover members comprising a detachable hinge permitting the lifting of the cover from the hinge and removal of the same from the base, and an operating connection between said cover and said handle for imparting angular movements to the cover, said operating connection bing disconnected by the removal of the cover from the base, said handle being pivotally fastened to the base member for carrying the cooker and the operating connection between the handle and the cover member including a pivotal connection below the level of the axis of the hinge pivot.

6. In an electric cooker of the character set forth in claim 3 the operative connections between the bail handle and the cover being concealed within the base element and including a link pivotally fastened to said cover at a point below the level of and on the opposite side of the hinge pivot from the handle.

7. In a cooker of the character set forth, a base element, a cover hinged thereto for pivotal movements about the hinge pivotal axis, a handle member pivotally fastened to the base member and an operative member between said handle and said cover for lifting and lowering the cover by moving the handle about its pivot, having a pivotal connection at one end with the handle at a point removed from the axis of the handle pivot and a pivotal connection with the cover at a point below the level of and on the opposite side of the hinge pivot from the handle, the pivotal connection between the operative member and the handle comprising a crank arm disposed substantially in the plane of the handle whereby with the handle disposed in a plane parallel to the base the operative member and the crank are in dead center position.

8. In a cooker of the character set forth a base member, a cover member therefor which is hinged thereto for angular movements thereabout and a handle pivotally fastened to said base member, a readily detachable hinge connection between said base member and said cover member which is disengaged by the act of lifting the cover member from the base, means carried by said base member for operatively connecting said handle with the hinge member carried by said cover for raising and lowering the cover in response to movements of the handle, said operative connections being readily separable and being disconnected merely by the act of lifting said cover member from the base.

9. In a cooker of the character set forth a base member, a cover member, a bail carrying member pivotally fastened to diametrically opposite points of the base member, said cover member having a separable hinge connection with the base permitting pivotal movements thereof with respect to the base and permitting the lifting of the cover member bodily from the base by the mere act of lifting the cover, and operative connections between said bail member and said cover comprising a pin slot actuating connection which is disengaged by the mere act of lifting the cover from the base, said operating connections comprising a bracket extending down below the level of the hinge axis and a tab on the base in the vicinity of the detachable hinge connection for maintaining the hinge connection during rapid manipulation of the bail member.

HERMAN F. DRECHSLER.
CHARLES W. ELSENHEIMER.